United States Patent
Sweeney et al.

(10) Patent No.: US 8,583,078 B2
(45) Date of Patent: Nov. 12, 2013

(54) FEMTO CELL SERVICE DELIVERY PLATFORM USAGE COMPLIANCE

(75) Inventors: Jeffrey Sweeney, Olathe, KS (US); Kelsyn D. S. Rooks, Overland Park, KS (US); Jeff Stafford, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 453 days.

(21) Appl. No.: 12/471,682

(22) Filed: May 26, 2009

(65) Prior Publication Data

US 2010/0304712 A1    Dec. 2, 2010

(51) Int. Cl.
*H04M 3/16* (2006.01)

(52) U.S. Cl.
USPC ........ 455/410; 455/411; 455/415; 455/456.1; 455/404.2; 455/420; 455/422.1; 455/457; 379/114.23; 379/114.21; 379/127.02; 379/127.05

(58) Field of Classification Search
USPC ............... 455/410, 456.1–457, 435–435.1, 455/114–114.2, 63–63.1, 406; 370/331, 370/338; 713/157, 164, 166; 726/22–24; 379/114.21, 114.2, 114.23, 127.02, 379/127.05
See application file for complete search history.

(56) References Cited

U.S. PATENT DOCUMENTS

| | | | |
|---|---|---|---|
| 7,333,800 B1 * | 2/2008 | Gopinath | 455/411 |
| 2007/0167170 A1 * | 7/2007 | Fitchett et al. | 455/456.1 |
| 2008/0043993 A1 * | 2/2008 | Johnson | 379/386 |
| 2009/0034702 A1 * | 2/2009 | Cai | 379/114.2 |
| 2009/0310559 A1 * | 12/2009 | Chen et al. | 370/331 |
| 2010/0041365 A1 * | 2/2010 | Lott et al. | 455/406 |

* cited by examiner

*Primary Examiner* — Vladimir Magloire
*Assistant Examiner* — Babar Sarwar
(74) *Attorney, Agent, or Firm* — Patton Boggs LLP (57) ABSTRACT

Embodiments of the disclosed invention include an apparatus, method, and computer program product for managing cellular usage in controlled areas. For example, in one embodiment, a cellular monitoring system communicates with one or more femto cells located within a controlled area for detecting the presence of unauthorized cellular devices or for monitoring the usage of cellular devices within the controlled area.

10 Claims, 5 Drawing Sheets

FEMTO CELL SERVICE DELIVERY PLATFORM USAGE COMPLIANCE

BACKGROUND OF THE INVENTION

The disclosed embodiments are related to the field of cellular technology. In particular, the disclosed embodiments provide an apparatus, method, and computer program product for managing cellular usage in controlled areas including penitentiaries, schools, nuclear facilities, military bases, and other high security areas.

Cellular usage in a high security area poses a security risk. For example, the majority of cellular phones today may include video and/or still image cameras that may enable a recording and/or photographs to be taken of confidential information. In addition, the ability for inmates to place unmonitored cellular calls poses an obvious security risk in penitentiaries. For instance, a recent published article stated that officials at a Texas prison have confiscated more than three hundred contraband cell phones in recent years. The cell phones are being smuggled in by visitors, corrupt prison guards, and, in some cases, carrier pigeon.

In addition to security risks, cellular usage in certain places may be distracting or prohibited. For example, cellular usage in a classroom or school campus may disrupt classes, distract students, or provide a means for cheating on exams.

Therefore, the disclosed embodiments seek to address some of the problems associated with having uncontrolled cellular usage.

SUMMARY

Embodiments of the disclosed invention include a system, method, and computer program product for managing cellular usage in controlled areas. For example, in one embodiment, a method executed by a cellular monitoring system is disclosed for managing cellular usage in a prison facility. The method comprises identify a cellular device within signal range of one or more femto cells placed in the prison facility, determining whether the cellular device is an authorized and device within the prison facility; and alerting security personnel in response to determination that the cellular device is not an authorized device within the prison facility. Additionally, in other embodiments, the method may be used to control cellular usage in other controlled areas, such as, but not limited to, schools, top-secret workplaces, nuclear facilities, and military bases.

BRIEF DESCRIPTION OF THE DRAWINGS

Illustrative embodiments of the present invention are described in detail below with reference to the attached figures, which are incorporated by reference herein and wherein.

DETAILED DESCRIPTION OF THE DRAWINGS

Embodiments of the disclosed invention include a system, method, and computer program product for managing cellular usage in controlled areas. As referenced herein, a controlled area is defined as an area where cellular communication may be intentionally restricted by authorities in control of the area. For example, controlled areas may include, but are not limited to, a prison facility, a school campus/classroom, a workplace, and/or a private viewing of a show. As will be further described, in some embodiments, certain of the disclosed embodiments may be utilized to simply detect the presence of unauthorized cellular devices within a controlled area. In other embodiments, the disclosed embodiments may be used to block cellular usage of all or unauthorized devices within the controlled area and/or record communications associated with cellular devices within a controlled area.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
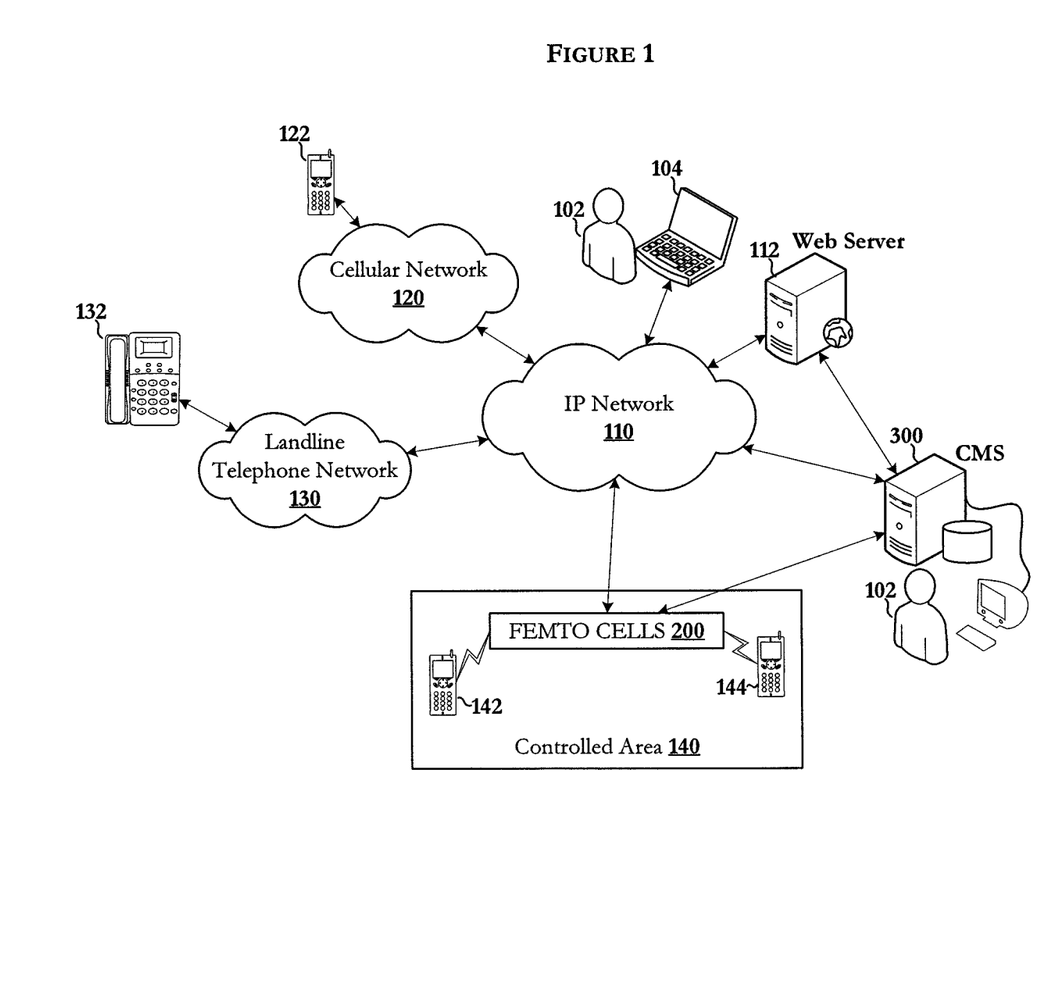
FIG. 1 depicts an embodiment of a network environment in which the illustrative embodiments may be implemented.

FIG. 1 depicts an embodiment of a network environment 100 in which the illustrative embodiments may be implemented. In the depicted embodiment, a cellular monitoring system 300 communicates with one or more femto cells 200 placed in one or more locations within a controlled area 140. For instance, in some embodiments, the one or more femto cells 200 may be placed in strategic locations within controlled area 140 for restricting cellular communications to a particular location or locations within controlled area 140. The particular size of a controlled area may be determined by varying the signal strengths associated with one or more of the femto cells and/or by modifying the number and/or location of femto cells within the controlled area.

A femto cell, as referenced herein, is a miniature cellular signal transmission device that communicates directly with cellular devices and routes cellular communications associated with the cellular devices over an IP network, such as the Internet, for facilitating cellular communications. Femto cells may be utilized to provide and/or improve cellular service to cellular devices that are located in areas that do not receive adequate cellular coverage.

In accordance with one embodiment, femto cells 200 may comprise one or more femto cells capable of communicating with a plurality of cellular devices on a plurality of different cellular frequencies and network technology. For instance, in some embodiments, femto cells 200 may include a universal femto cell capable of communicating with cellular devices on a 850 MHz Global System for Mobile Communications (GSM) network, a 1900 MHz GSM network, a 1900 MHz Code-Division Multiple Access (CDMA) network, and a 700 MHz 3G network. Alternatively, in other embodiments, femto cells 200 may comprise a plurality of single service provider femto cells, each capable of communicating with cellular devices on a single service provider cellular network. For example, in the disclosed embodiment, femto cells 200 may be configured to support cellular communications with a cellular device 142 over a first cellular frequency/network technology and support cellular communication with a cellular device 144 over a second cellular frequency/network technology.

Femto cells 200 act like regular cell towers, except that femto cells 200 backhaul the voice or data communications associated with a mobile device over an IP network instead of using cellular terrestrial towers. Similar to how cellular communications is handed off from one cellular terrestrial tower to the next closest cellular terrestrial tower, in one embodiment, when a mobile communication device is within signal range of femto cells 200, the cellular communication associated with the mobile device is automatically handed off to femto cells 200. Accordingly, in a preferred embodiment, all cellular communications of mobile devices within signal range of femto cells 200 are automatically routed through femto cells 200 based on the configuration settings of femto cells 200.

For instance, in one embodiment, femto cells 200 route the all cellular communications for cellular devices located within controlled area 140 to cellular monitoring system 300 via IP network 110 for enabling cellular monitoring system 300 to control cellular usage within controlled area 140. In other embodiments, femto cells 200 may route all cellular communications to cellular monitoring system 300 over a direct wired or wireless connection. Further, in some embodiments, femto cells 200 may route information pertaining to the cellular communication, such as, but not limited to, an identifier of the calling device and a calling number, to cellular monitoring system 300 instead of routing the entire cellular communication to cellular monitoring system 300. In other words, in some embodiments, cellular monitoring system 300 merely gathers information instead of handling the actual routing the cellular communications.

In one embodiment, IP network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, IP network 110 may include other types of data networks, such as, but not limited to, an intranet, a private local area network (LAN), a wide area network (WAN), and a wireless local area network (WLAN).

In addition, in some embodiments, IP network 110 may communicate with other types of network, such as, but not limited to, cellular network 120 and landline telephone network 130 for routing cellular communications to and from femto cells 200. In one embodiment, cellular network 120 may include one or more GSM networks, CDMA networks, an Enhanced Data GSM Environment (EDGE) network, and a 3G/4G network, each for facilitating voice communications to cellular devices, such as, cellular device 122.

Landline telephone network 130 may include a public switched telephone network (PSTN) for facilitating voice communication landline telephone devices, such as, telephone 132. The public switched telephone network is the standard analog telephone network utilized by most homes. In addition, in some embodiments, landline telephone network 130 may also include digital telephone networks, such as, but not limited to, an integrated services digital network (ISDN) and a fiber distributed data interface (FDDI) network.

In accordance with one embodiment, cellular monitoring system 300 may include logic for communicating with a web server 112 for receiving configurations from a user 102. As referenced herein, logic is defined as hardware, software, and/or a combination thereof. For instance, in one embodiment, user 102 may utilize a computer 104 to access a website/portal hosted on web server 112 for remotely configuring cellular monitoring system 300. Alternatively, or in addition, in some embodiments, user 102 may locally configure cellular monitoring system 300.

Figure 2:
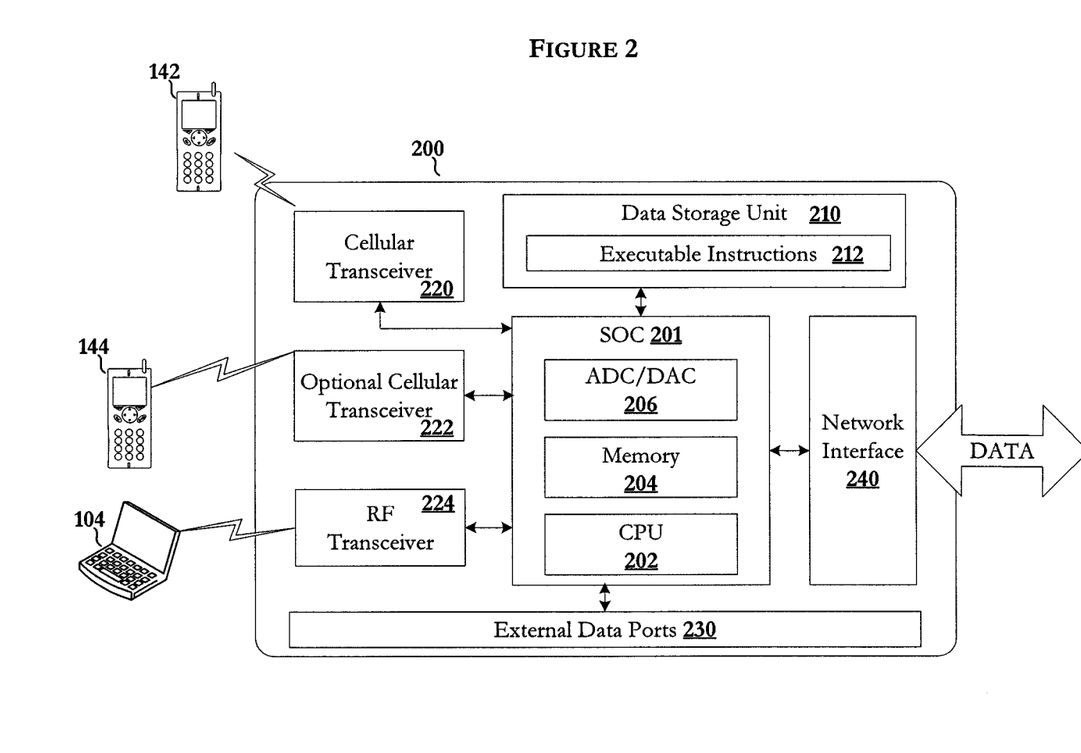
FIG. 2 depicts an embodiment of a femto cell in accordance with the illustrative embodiments.

With reference now to FIG. 2, an embodiment of a femto cell 200 is presented in accordance with certain of the disclosed embodiments. In the depicted embodiment, femto cell 200 includes a system-on-a-chip (SoC) 201. In one embodiment, SoC 201 may integrate all or a majority of the components of femto cell 200, such as, but not limited to, one or more processors/microprocessors 202 and memory 204 (e.g., RAM), into a single integrated circuit chip. In addition, in some embodiments, SoC 201 may include an analog-to-digital converter (ADC) and a digital-to-analog converter (PAC) 206 for converting between analog signals and digital format.

In some embodiments, femto cell 200 may include one or more data storage units 210, such as, but not limited to, a hard disk drive for storing executable instructions 212 and/or other data, such as, but not limited to, access rules, routing tables, and quality of service (QoS) rules for intelligent routing. For instance, in some embodiments, executable instructions 212 may include executable instructions for authenticating user access and for routing all cellular communications within controlled area 140 to cellular monitoring system 300 via network interface 240. Network interface 240 may be a network interface card, such as, but not limited to, a modem, an Ethernet card, and/or a wireless network interface card for connecting femto cell 200 to IP network 110.

In accordance with one embodiment, femto cell 200 may include a cellular transceiver 220 for communicating cellular signals between femto cell 200 and one or more cellular devices within signal range of femto cell 200, such as, cellular device 142. For instance, femto cell 200 may be configured to communicate with cellular device 142 on a control channel to determine the mobile identification number (MIN) or international mobile equipment identity (IMEI) associated with cellular device 142. A control channel is a channel carrying network information rather than the actual voice or data messages transmitted over the network for enabling cellular devices to identify themselves and their location to the cellular networks. In accordance with one embodiment, femto cell 200 may pass the MIN or IMEI associated with cellular device 142 to cellular monitoring system 300 to determine whether cellular device 142 is an authorized cellular device within controlled area 140. In some embodiments, femto cell 200 may include multiple cellular transceivers, such as, optional cellular transceiver 222. For instance, in some embodiments, optional cellular transceiver 222 may be configured to operate on a different service provider cellular network than that associated with cellular transceiver 220.

In addition, in some embodiments, femto cell 200 may include a radio frequency (RF) transceiver 224. In one embodiment, radio frequency transceiver 224 supports the Wireless Application Protocol (WAP) and/or Wi-Fi standard for enabling wireless data communication with one or more wireless Internet accessible devices, such as, but not limited to, a laptop computer and/or a PDA device with Wi-Fi capabilities. For instance, in one embodiment, user 102 may utilize laptop computer 104 to remotely configure cellular monitoring system 300 via femto cell 200. Additionally, in some embodiments, femto cell 200 may include one or more external data ports 220 (e.g., a USB port) for transferring and/or storing data on an external data storage unit and/or for connecting femto cell 200 to an external device.

Figure 3:
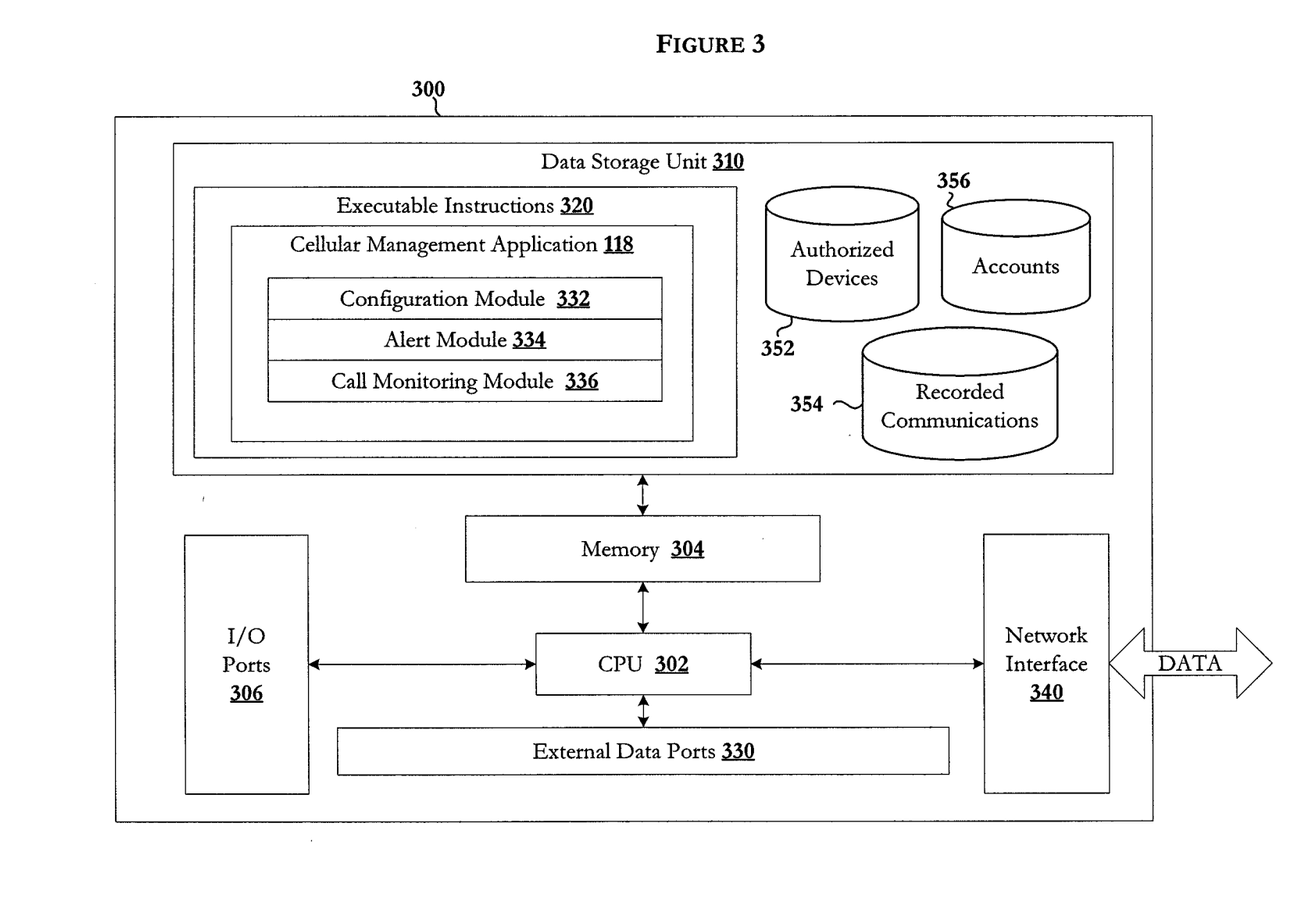
FIG. 3 depicts an embodiment of a cellular monitoring system for managing cellular communications in a controlled area in accordance with some of the disclosed embodiments.

FIG. 3 depicts an embodiment of cellular monitoring system 300 for managing cellular communications in a controlled area in accordance with some of the disclosed embodiments. In the depicted embodiment, cellular monitoring system 300 includes, among other components, a processing unit 302, memory 304, and at least one data storage unit 310. Processing unit 302 serves to execute computer executable instructions stored in memory 304 and/or data storage unit 310. In one embodiment, processing unit 302 may include one or more processing cores, such as, but not limited to, a microcontroller, microprocessor, or digital signal processor, for executing instructions and processing data for managing cellular communications within a controlled area.

In one embodiment, memory 304 may be volatile memory. Volatile memory is memory that requires power to maintain stored information. For example, in some embodiments, memory 304 may be random access memory (RAM). Random access memory stores currently executing instructions and/or other data utilized by an operating system, software application and/or hardware device.

Additionally, data storage unit 310 may be non-volatile memory, such as, but not limited to, a hard disk drive, for storing data. For example, in some embodiments, data storage unit 310 may store computer executable instructions 320 and/or other data. In some embodiments, computer executable instructions 320 may include executable instructions associated with a cellular management application 118 for managing cellular usage in a controlled area. In addition, in some embodiments, data storage unit 310 may include one or more databases, such as, but not limited to, an authorized devices database 352, a recorded communications database 354, and an accounts database 356. Alternatively, in some embodiments, the depicted databases may be stored on one or more remote systems and/or the data contained in the databases may be stored in other types of data structures, such as, but not limited to, a data table, a linked list, and/or an array.

In some embodiments, cellular monitoring system 300 may also include one or more external data ports 330. For example, in one embodiment, external data ports 330 may include a universal serial bus (USB) port for connecting one or more USB devices to cellular monitoring system 300, such as, but not limited to, a USB flash drive for providing external data storage. In addition, in some embodiments, cellular monitoring system 300 may include one or more input/output (I/O) ports 306. In one embodiment, input/output ports 306 may include communication ports for coupling one or more input/output device to cellular monitoring system 300, such as, but not limited to, a monitor, a keyboard, and a mouse. Further, in some embodiments, cellular monitoring system 300 may include a network interface 340. For example, in one embodiment, network interface 340 may be a network interface card, such as, but not limited to, an Ethernet card for connecting cellular monitoring system 300 to a network, such as, but not limited to, IP network 110.

In accordance with one embodiment, cellular management application 118 may include a configuration module 332. In one embodiment, configuration module 332 may comprise computer executable instructions for configuring cellular monitoring system 300. For instance, in one embodiment, configuration module 332 may include instructions for interfacing with a front-end system, such as, but not limited to, web server 112 for receiving user specified configuration parameters. For example, in one embodiment, a user may configure cellular monitoring system 300 to block all cellular communications within a controlled area. Alternatively, in some embodiments, a user may configure cellular monitoring system 300 to enable cellular communications to only authorized cellular devices and/or to only authorized calling numbers (e.g., 911 calls only and/or other user-specified numbers). Additionally, in some embodiments, configuration module 332 may comprise computer executable instructions for enabling a user to edit a list of authorized cellular devices stored in authorized devices database 352.

In addition, in some embodiments, cellular management application 118 may include an alert module 334. For example, in one embodiment, alert module 334 may comprise computer executable instructions for alerting security personnel of unauthorized cellular devices in a controlled area. In one embodiment, a user may configure alert module 334 to alert the appropriate personnel either via text message, email, voice recording, and/or via an audible alarm. In some embodiments, the alert message may contain information about the unauthorized device, such as, but not limited to, the mobile identification number associated with the unauthorized device and an approximate location of the unauthorized device. For example, in one embodiment, the alert message may include location information of the unauthorized device based on the location of the detecting femto cell within the controlled area. In other embodiments, alert module 334 may communicate with a cellular service provider subscriber database to determine a subscriber name associated with the unauthorized device. In one embodiment, alert module 334 may comprise computer executable instructions for blocking cellular communications associated with the unauthorized device. Further, in some embodiments, alert module 334 may comprise computer executable instructions for transmitting a text message or simultaneously calling one or more of the cellular devices communicating via femto cell 200. For example, in one embodiment, alert module 334 may be utilized to transmit an alert message to a specified group of cellular devices registered with alert module 334 or to all cellular devices informing the users of the cellular devices of an emergency, such as, but not limited to, informing prison guards of a fight in a particular area of a penitentiary or informing school personnel to lock down a school because of a security risk.

Additionally, in some embodiments, cellular management application 118 may also include a call monitoring module 336. In one embodiment, call monitoring module 336 may comprise computer executable instructions for monitoring communications of authorized or unauthorized cellular devices within a controlled area. For example, in one embodiment, call monitoring module 336 may enable authorized cellular devices to be utilized within a controlled area during specified times (e.g., during lunch hours) and/or for a specified duration (e.g., to limit personal calls to 5 minutes). In addition, in some embodiments, call monitoring module 336 may be utilized to track calling activities and monitor cellular usage. For instance, in one embodiment, authorized cellular devices may be given to a prison inmate for enabling the inmate to make calls using minutes earned in exchange for good behavior and/or work programs. In one embodiment, call monitoring module 336 tracks the duration of the call to ensure that the call does not exceed an allotted amount of time and subtracts the duration of the call from a user account stored in accounts database 356. Further, in some embodiments, call monitoring module 336 may be configured to record communications associated with cellular devices located in a controlled area (e.g., in a prison environment). In some embodiments, cellular monitoring system 300 may store the recorded communications locally in recorded communications database 354. Alternatively, in some embodiments, cellular monitoring system 300 may store the recorded communications on a separate device or storage unit.

Figure 4:
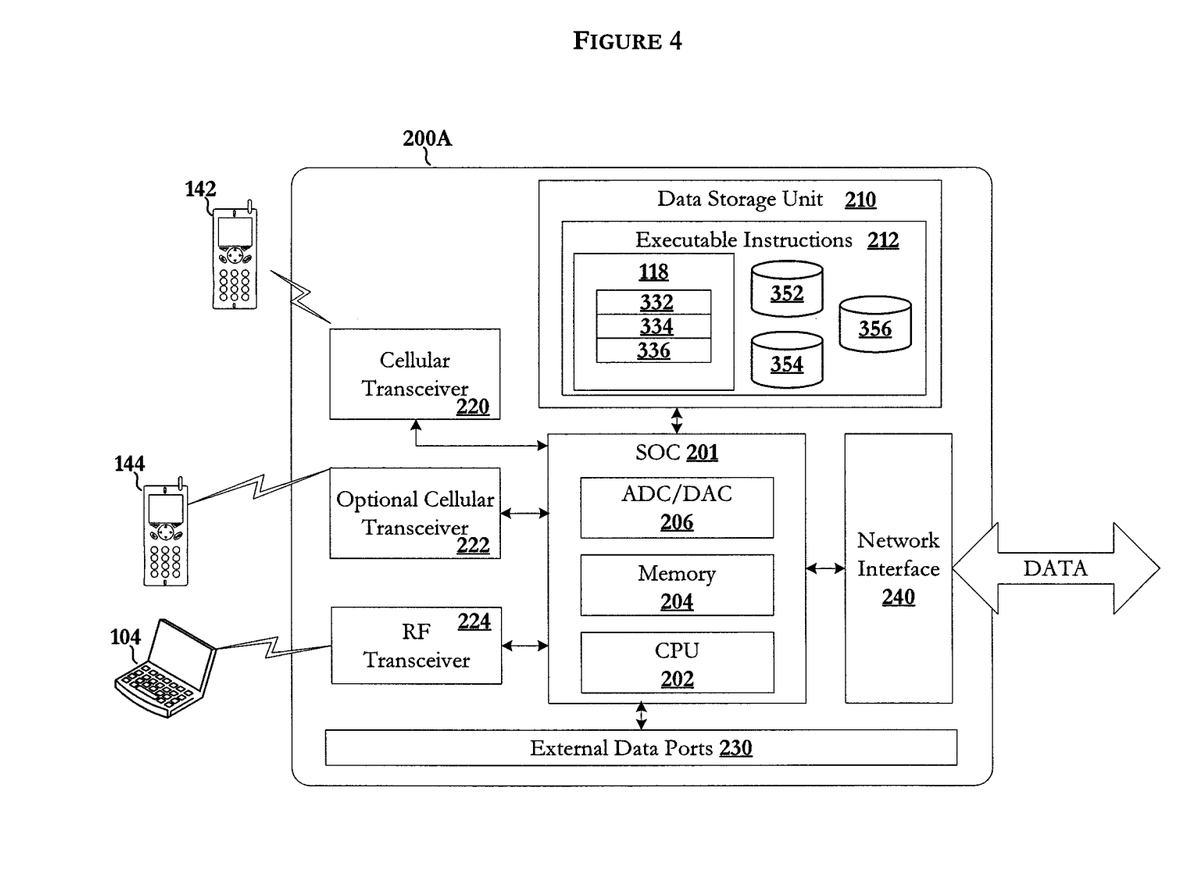
FIG. 4 depicts another embodiment of a femto cell for managing cellular communications in a controlled area in accordance with certain of the disclosed embodiments.

With reference now to FIG. 4, an embodiment of a femto cell 200A is depicted in accordance with certain of the disclosed embodiments. For example, in one embodiment, femto cell 200A may include all of the components as presented in femto cell 200 as described in FIG. 2. In addition, in certain embodiments, femto cell 200A may incorporate the logic of cellular monitoring system 300, as described above, into an all-in-one intelligent femto cell. In these embodiments, femto cell 200A may communicate with a Web server such as Web server 112 for receiving configuration data for managing cellular usage in a controlled area, such as, but not limited to, a list of authorized cellular devices. Alternatively, in some embodiments, femto cell 200A may include logic for enabling a user to configure femto cell 200A locally. For example, in one embodiment, a user, using laptop computer 104, may communicate wirelessly with femto cell 200A, via radio frequency (RF) transceiver 224, to configure femto cell 200A. In other embodiments, a data processing system may communicate with femto cell 200A using a wired connection via network interface 240. Accordingly, in some embodiments, femto cell 200A may be a stand-alone system capable of performing some or all of features of managing cellular usage in a controlled area as described above in certain embodiments.

FIGS. 2-4 are not intended to imply and/or restrict the architecture, functionality, and operation of other possible implementations of femto cell 200, femto cell 200A, and cellular monitoring system 300 that are within the scope of the disclosed embodiments. For example, other possible implementations may include additional components not depicted in FIGS. 2-4 and/or the deletion/combination of one or more of the illustrated components. In addition, although, the depicted embodiment in FIG. 3 describes the modules as computer implemented instructions, the features and functions provided by the modules may be in any form of logic including an entirely hardware embodiment or an embodiment containing both hardware and software elements. In addition, in some embodiments, the disclosed modules may be implemented in software, including, but not limited to, firmware, resident software, and microcode, that are executed by a processor, such as, but not limited to, processing unit 302.

Figure 5:
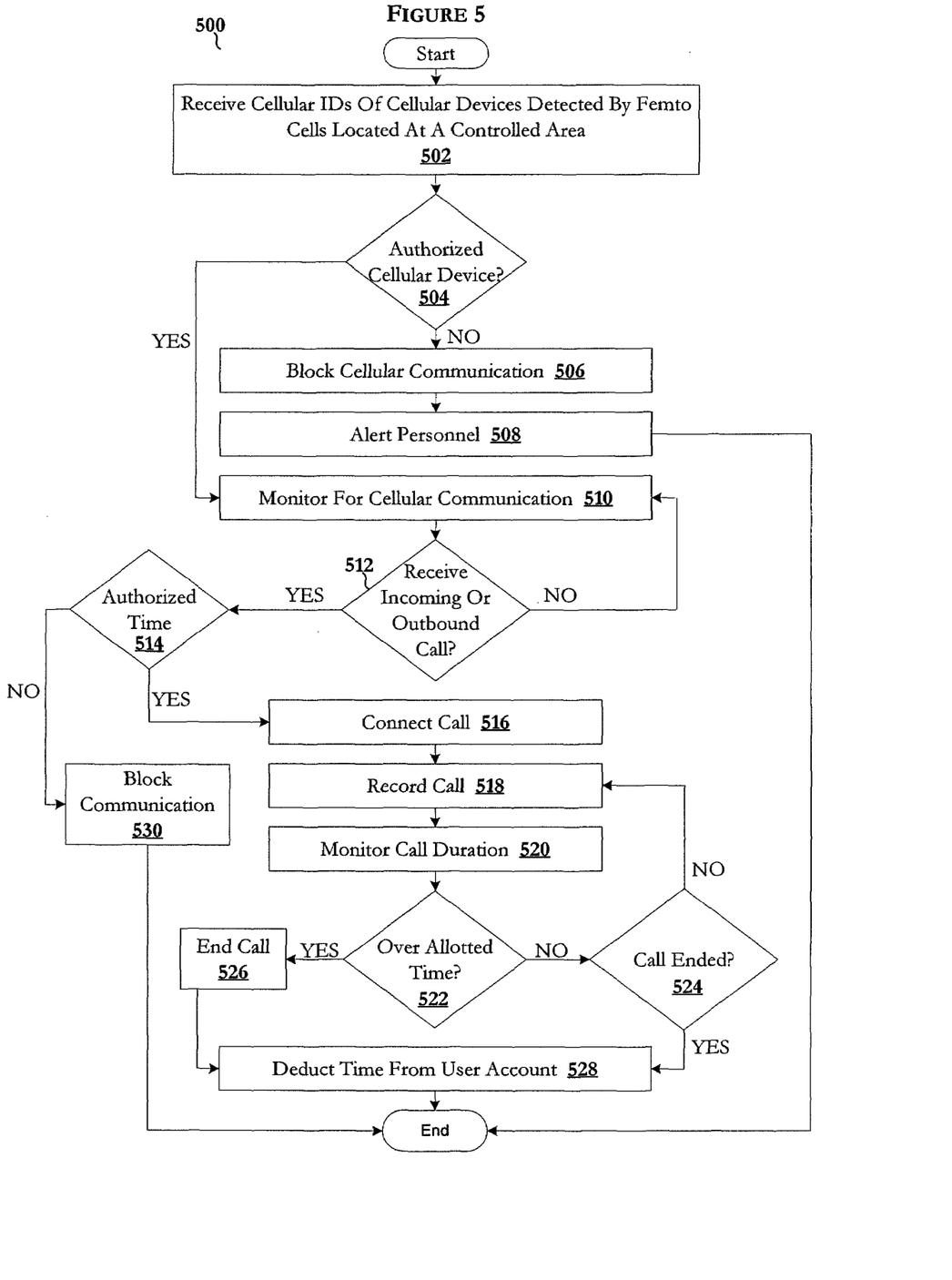
FIG. 5 depicts an embodiment of a process for managing cellular usage in a controlled area in accordance with some of the disclosed embodiments.

With reference now to FIG. 5, an embodiment of a process 500 for managing cellular communicating in a controlled area is presented. In accordance with one embodiment, process 500 may be executed by a data processing system, such as, cellular monitoring system 300. In the depicted embodiment, process 500 begins, at step 502, by receiving a cellular identifier, such as, a phone number or international mobile equipment identifier, associated with a cellular device that is detected by a femto cell located within a controlled area. At step 504, the process determines whether the detected cellular device is an authorized device within the controlled area. For example, in one embodiment, the process queries an authorized cellular device database to determine whether the received cellular identifier is an authorized device. In one embodiment, if the process determines that the cellular device is unauthorized, the process, at step 506, blocks all cellular communication associated with the unauthorized cellular device. At step 508, the process alerts the appropriate personnel via a user-specified means, such as, but not limited to, text message, email, voice recording, and/or via an audible alarm.

However, if, at step 504, the process determines that the cellular device is an authorized device, the process monitors for cellular communication associated with the cellular device at step 510. In one embodiment, if the process, at step 512, receives an inbound or outbound call associated with the cellular device, the process may, at step 514, determine whether the call is occurring during an authorized time. In one embodiment, if the process determines that the call is occurring during an unauthorized time, the process, at step 530, blocks the inbound or outbound call from connecting, with process 500 terminating thereafter. In some embodiments, the process may log the calling information, such as, but not limited to, the time of the call and the caller identification of the second calling party, in a log file that is accessible to authorized personnel. Alternatively, in some embodiments, the process may automatically route all calls directly to a voicemail server associated with the cellular device (e.g., in a classroom environment).

In one embodiment, if the process, at step 514, determines that the inbound or outbound call occurs during an authorized time, the process connects the call at step 516. In some embodiments, the process, at step 518, records the conversation between the calling parties (e.g., all calls from a prison facility are automatically recorded). In one embodiment, the process continues to monitor and record the phone conversation until a determination is made that the call has ended at step 524. In other embodiments, the process may monitor the duration of the call at step 520. For example, in some embodiments, the process may, at step 522, determine whether the call duration exceeds a specified allotted time. In these embodiments, process 500 may terminate the call, at step 526, if the call duration exceeds a specified allotted time. In addition, the process may deduct the call duration from a user account at step 528, with process 500 terminating thereafter.

Accordingly, the disclosed embodiments provide a system and method for managing cellular usage in controlled areas. In addition, certain of the disclosed embodiments enable detection of unauthorized cellular devices within a controlled area, such as, but not limited to, a prison and/or a top-secret facility. The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s).

In some alternative implementations, the functions noted in the block may occur out of the order noted in the figures and/or may be omitted. For instance, in some embodiments, process 500 may alert the appropriate personnel of an unauthorized cellular device without blocking cellular communications associated with unauthorized device. In addition, two blocks shown in succession may, in fact, be executed substantially concurrently, or the blocks may sometimes be executed in the reverse order, depending upon the functionality involved. Further, in some embodiments, each block of the block diagrams and/or flowchart illustration, and combinations of blocks in the block diagrams and/or flowchart illustration, may be implemented entirely with hardware or as a software embodiment (including firmware, resident software, micro-code, etc.) or an embodiment combining software and hardware aspects for performing the specified functions or acts.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A method executed by a cellular monitoring system for managing cellular usage in a controlled area, the method comprising:
   identify a cellular device within signal range of one or more femto cells placed in a controlled area, wherein a size of the controlled area is configurable by varying the signal strengths associated with the one or more femto cells, and wherein identify the cellular device within signal range of one or more femto cells placed in the controlled area is performed using a control channel;
   determining whether the cellular device is an authorized device within the controlled area;
   communicating with a cellular service provider subscriber database to determine a subscriber name associated with the cellular device in response to a determination that the cellular device is an unauthorized device;
   alerting security personnel in response to determination that the cellular device is not an authorized device within the controlled area;
   receiving an incoming or outgoing call associated with the cellular device;
   determining whether the incoming or outgoing call occurs during an authorized time;
   blocking the incoming or outgoing call in response to a determination that the incoming or outgoing call occurs during an unauthorized time;
   monitoring a duration of an incoming or outgoing call associated with the cellular device;
   subtracting an amount of time associated with the duration of the incoming or outgoing call from a calling account associated with a user of the cellular device;
   restricting calls associated with the cellular device to only authorized calling numbers; and
   receiving user configurations for alerting the security personnel from a user via a Web portal associated with the cellular monitoring system, wherein an alert message includes information about an unauthorized cellular device including a mobile identification number associated with the unauthorized cellular device and an approximate location of the unauthorized cellular device.

2. The method of claim 1, further comprising updating a location status of the cellular device to provide an approximate location of the cellular device in response to a determination that the cellular device is an authorized device within the controlled area.

3. The method of claim 1, further comprising:
   recording an incoming or outgoing call associated with the cellular device.

4. The method of claim 1, further comprising disconnecting a call associated with the cellular device in response to a determination that the call has exceeded a predetermined amount of time.

5. A cellular monitoring system for managing cellular usage in a controlled area, the cellular monitoring system comprising:
   a network interface for communicating with one or more femto cells placed in a controlled area for identifying cellular devices in the controlled area, and wherein identifying the cellular devices in the controlled area is performed using a control channel;
   a data storage unit for storing identification data associated with authorized cellular devices within the controlled area; memory for storing computer executable instructions;
   a processor configured to execute the computer executable instructions to:
   configure a size of the control area based on signal strengths associated with the one or more femto cells;
   determine whether a cellular device within the controlled area is an authorized device using the identification data;
   communicate with a cellular service provider subscriber database to determine a subscriber name associated with the cellular device in response to a determination that the cellular device is an unauthorized device;
   block cellular communications associated with the cellular device in response to determination that the cellular device is not an authorized device within the controlled area;
   transmit a message to a plurality of specified cellular devices within the controlled area;
   monitor a duration of an incoming or outgoing call associated with the cellular device;
   subtract an amount of time associated with the duration of the incoming or outgoing call from a calling account associated with a user of the cellular device;
   enable cellular communications associated with the cellular device only to prespecified calling numbers; and
   receive user configurations for alerting security personnel from a user via a Web portal associated with the cellular monitoring system, wherein an alert message includes information about an unauthorized cellular device including a mobile identification number associated with the unauthorized cellular device and an approximate location of the unauthorized cellular device.

6. The cellular monitoring system of claim 5, wherein the processor is further configured to execute the computer executable instructions to block cellular communications associated with the cellular device during specified times.

7. The cellular monitoring system of claim 5, wherein the processor is further configured to execute the computer executable instructions to record cellular communications associated with the cellular device.

8. The cellular monitoring system of claim 5, wherein the processor is further configured to execute the computer executable instructions to monitor a duration of a call associated with the cellular device and terminate the call in response the call exceeding a prespecified duration.

9. The cellular monitoring system of claim 5, wherein the processor is further configured to execute the computer executable instructions to block all cellular communications within the controlled area.

10. A non-transitory computer program product comprising a computer usable medium having a computer readable program code embodied therein, said computer readable program code comprising instructions to:

configure a size of a control area based on signal strengths associated with one or more femto cells;

identify, using a control channel, a cellular device within signal range of the one or more femto cells placed in the controlled area;

determine whether the cellular device is an authorized device within the controlled area;

communicate with a cellular service provider subscriber database to determine a subscriber name associated with the cellular device in response to a determination that the cellular device is an unauthorized device;

block cellular communications associated with the cellular device in response to a determination that the cellular device is not an authorized device within the controlled area;

transmit a message to a plurality of specified cellular devices within the controlled area;

monitor a duration of an incoming or outgoing call associated with the cellular device;

subtract an amount of time associated with the duration of the incoming or outgoing call from a calling account associated with a user of the cellular device;

restrict calls associated with the cellular device to only authorized calling numbers; and receive user configurations for alerting security personnel from a user via a Web portal, wherein an alert message includes information about an unauthorized cellular device including a mobile identification number associated with the unauthorized cellular device and an approximate location of the unauthorized cellular device.

* * * * *